United States Patent [19]

Mifsud

[11] Patent Number: 4,633,970
[45] Date of Patent: Jan. 6, 1987

[54] DISTRIBUTED MARINE SEISMIC SOURCE

[75] Inventor: Joseph F. Mifsud, Houston, Tex.

[73] Assignee: Exxon Production Research Co., Houston, Tex.

[21] Appl. No.: 567,701

[22] Filed: Jan. 3, 1984

[51] Int. Cl.[4] .................... G01V 1/135; G01V 1/38
[52] U.S. Cl. ............................ 181/120; 181/402; 367/143; 367/189
[58] Field of Search ............... 181/118, 120, 110, 402, 181/106, 111, 113, 115, 119, 139, 142; 367/142, 143, 144, 153, 163, 174, 175, 189

[56] References Cited

U.S. PATENT DOCUMENTS

| | | | |
|---|---|---|---|
| 3,056,104 | 9/1962 | De Kanski et al. | 181/120 X |
| 3,329,930 | 7/1967 | Cole et al. | 181/120 |
| 3,349,367 | 10/1967 | Wisotsky | 181/120 X |
| 3,384,868 | 5/1968 | Brown et al. | 367/143 |
| 3,392,369 | 7/1968 | Dickie et al. | 181/120 X |
| 3,403,374 | 9/1968 | Mellen et al. | 181/120 X |
| 3,653,460 | 4/1972 | Chelminski | 181/120 |
| 3,658,149 | 4/1972 | Neal et al. | 181/118 |
| 3,691,516 | 9/1972 | Graham et al. | 367/143 |
| 4,016,952 | 4/1977 | Reed et al. | 181/118 |
| 4,030,063 | 6/1977 | Wallen | 181/120 X |
| 4,141,431 | 2/1979 | Baird | 181/110 X |
| 4,142,171 | 2/1979 | Pickens | 367/143 |
| 4,193,472 | 3/1980 | Kirby | 367/147 X |
| 4,211,301 | 7/1980 | Mifsud | 181/120 |
| 4,387,451 | 6/1983 | Wilcox | 367/142 |
| 4,483,411 | 11/1984 | Mifsud | 181/402 X |

Primary Examiner—Charles T. Jordan
Assistant Examiner—John E. Griffiths
Attorney, Agent, or Firm—E. Thomas Wheelock; Keith A. Bell

[57] ABSTRACT

The invention relates to a compact tunable subsea seismic source. The source has multiple seismic radiating plates placed symmetrically about a central housing which contains a hydraulic actuating system. The source is towed to optimize the amount of energy applied to the surrounding water.

10 Claims, 3 Drawing Figures

U.S. Patent   Jan. 6, 1987   4,633,970
FIG.1
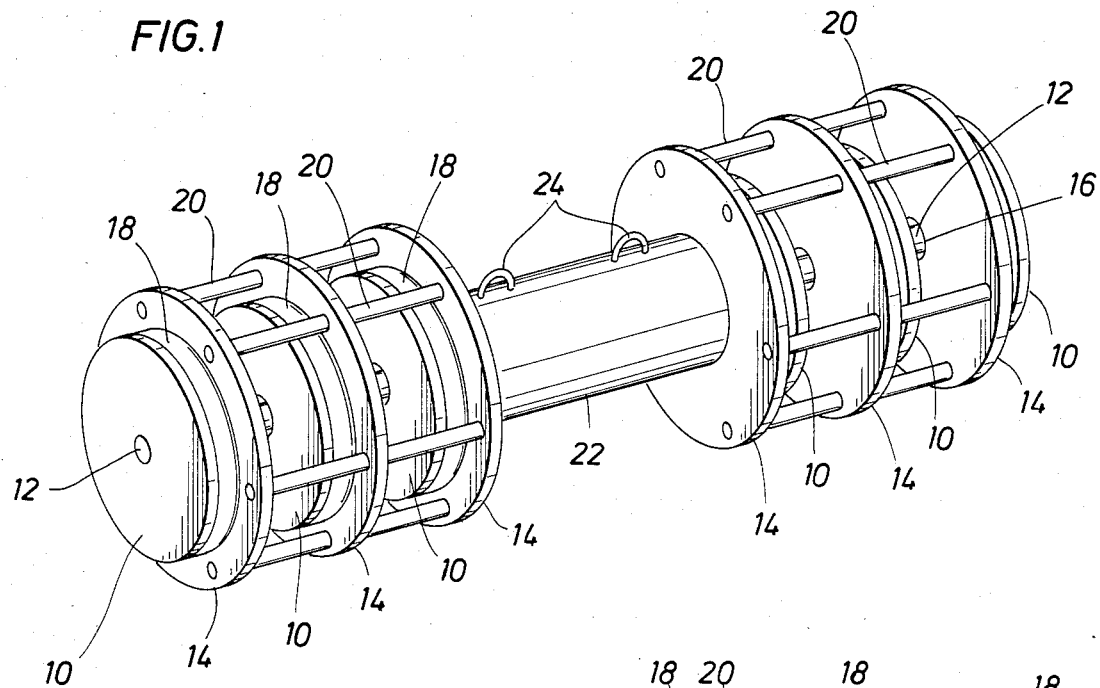
OPPOSITELY DIRECTED VARIABLE FREQUENCY ACTUATORS
FIG.2
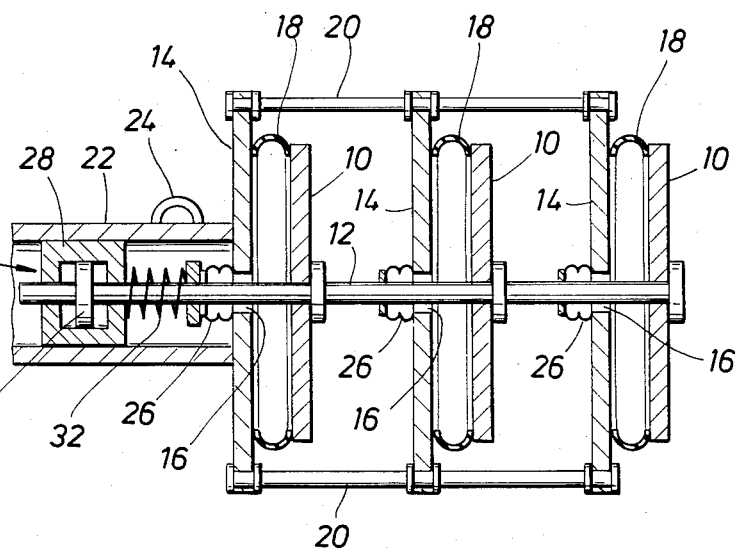
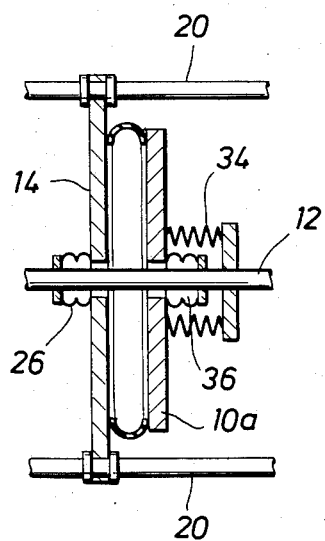
FIG. 3

DISTRIBUTED MARINE SEISMIC SOURCE

FIELD OF THE INVENTION

This invention relates to a compact tunable seismic source used to generate seismic signals in the search for petroleum beneath a water body. In particular, it relates to a source having multiple acoustic radiating plates which provide high total seismic radiation area without using excessively large single plates. The output mechanical impedance of the seismic source may be tuned so that a high percentage of the energy applied to the source transducer is converted to seismic energy in the water. The seismic source desirably is of a type producing a frequency modulated signal that sweeps at least a portion of the spectrum between about 10 and 100 Hz.

BACKGROUND OF THE INVENTION

The ever more difficult search for petroleum has led to exploration in areas which were thought by many just a short time ago to be incapable of producing petroleum at an economically feasible price. The rising price of petroleum coupled with its relative domestic scarcity has made acceptable the costs associated with production in Alaska and the North Sea, as well as in a number of offshore areas.

Of the many methods used in prospecting for subsea petroleum, few have attained as widespread an acceptance as has the use of towable marine seismic sources.

The theory of operation in using marine seismic sources to search for petroleum is quite simple. A seismic signal is introduced into the water body. The wave propagates down through the water, across the water-floor interface, and into subfloor geologic formations. The resultant echoes are, to some extent, reflected back across the same path to an array of hydrophones located near the water's surface. Analysis of the signals produced by the hydrophones can provide some information concerning the structure of the subfloor geological formations and attendant petroleum accumulation in those formations.

The term "water" as used herein is meant to include swampwater, mud, marshwater, seawater or any other liquid containing sufficient water to enable operation of the invention.

There are many different methods of producing a seismic pulse. For instance, the earliest attempts entailed the use of solid explosives. This method produces a strong low frequency signal which, accordingly, achieves substantial penetration into subfloor geologic formations and a strong return echo. However, solid explosives possess certain inherent drawbacks: they are dangerous to store, handle, and use. When set off in open water, they kill marine life. In a crowded area such as a harbor, they cannot be used at all. Solid explosives are orders of magnitude more expensive to use, on a per-shot basis, than are most other acoustic sources. Modification of the signature to achieve an acceptable frequency spectrum distribution is most difficult.

Apparatus using explosive gas mixtures, e.g., propane and oxygen, to produce a seismic signal in the form of a pulse or shock wave have gained wide acceptance. The two major types of explosive gas guns are: first, those which operate by exploding a gas mixture behind a flexible membrane which is in contact with the water; and, second, those which operate by allowing the abrupt bubble from the gas explosion to pass directly into the water. An example of the former apparatus can be found in U.S. Pat. No. 3,658,149; an example of the latter apparatus can be found in U.S. Pat. No. 4,193,472.

Other devices using high pressure compressed gases to generate a seismic pulse have also gained wide acceptance in the industry. These apparatus, or guns, typically employ a gas-holding chamber which is pressurized to attain some pre-set level and is fired by allowing the pressurized gas to explosively exit the gun into the surrounding water. Examples of open-ported pressurized gas guns are found in U.S. Pat. No. 3,653,460, to Chelminski, and U.S. Pat. No. 4,141,431, to Baird.

The device of the present invention is a member of a class which generates a relatively instantaneous low-power and low-frequency (10–100 Hz) signal known as a "chirp" which extends over a period of seconds. The transmitted signals are desirably low-frequency to reduce attenuation losses in the reflected waves. Unlike the previously mentioned devices which emit a short duration pulse and thereby provide a discrete echo at some readily determinable point in time, the chirp devices often vary the frequency of the transmitted signal in some pre-set manner so that a unique frequency in the reflected signal can be correlated as a function of time with that same frequency in the transmitted signal. A collection of received signals or "trace" can be mathematically manipulated to produce a subterranean map.

The transducer in subsea vibrator devices typically is an acoustic piston or plate in contact with the water and driven by a pneumatic or hydraulic actuator modulated at the desired frequency. An example of such a device is found in U.S. Pat. No. 4,211,301, to Mifsud. The patent does not discuss methods of continuously tuning the source for maximum output nor does it suggest the use of multiple ganged plates moving in unison to produce seismic waves.

There is a limit to the amount of energy that can be introduced into a subsea acoustic wave. That amount depends on, inter alia, the size of the transducer, the amplitude of oscillation, the depth of source placement, temperature and salinity of the water, and the frequency of the transmission. When this threshold amount of induced energy is exceeded, the source cavitates and produces gas bubbles rather than a clean acoustic signal. Nevertheless, the strength of the acoustic signal should be maximized to assure the strongest possible echo. The invention disclosed herein deals with apparatus suitable for maximizing the efficiency of such a marine seismic source by adjusting its output impedance so that a higher percentage of the input power is used to radiate acoustic energy.

Other marine seismic sources are known which provide for the prevention of cavitation. The disclosure in U.S. Pat. No. 3,691,516, to Graham et al, provides a description of an apparatus having a pair of acoustic pistons located at opposite ends of the device. The acoustic pistons are held outward from the center of the seismic source by a pair of variable volume chambers. The pressure within the variable volume chambers is repetitively varied downward and then returned to the initial value. This sharp reduction in pressure causes the pistons to move inward initiating the pulse. Hydraulic cylinders attached to the pistons via piston rods then tend to restore the pistons to their original extended positions. The acceleration rate of the pistons is controlled using a feedback loop so that the pistons produce the maximum possible acoustic output power as limited by the cavitation threshold. The acceleration rate is varied by pressure control of the fluid introduced into the aforementioned hydraulic cylinders. The frequency of the device is changed by a fulcrum and beam arrangement operating in conjunction with the piston-restoring hydraulic cylinders.

The Graham et al device produces a pulse which has the maximum power attainable for the physical size of the acoustic pistons in their particular surrounding fluid. The device desirably operates just below the cavitation threshold. The device does not vary its output impedance to maximize output at a particular available power input using the apparatus of the instant invention.

Other marine seismic sources which suggest tuning the source for maximum output are typified by: U.S. Pat. Nos. 3,349,367, to Wisotsky; 3,392,369, to Dickie et al: 4,030,063, to Wallen; and 4,142,171, to Pickens. Each of these patents, however, involves a single frequency source.

SUMMARY OF THE INVENTION

The inventive marine seismic source has a multiple of radiating plates, mounted at opposite ends of a supporting frame, and which are driven by a balanced double-ended, push-pull hydraulic drive cylinder. The source produces a frequency modulated signal which desirably is linearly swept through a low frequency spectrum by modulation of the hydraulic fluid introduced into the drive cylinder. The mechanical impedance of the gang of radiating plates may be continuously varied with the sweeping frequency by utilizing springs of differing spring rates to attach to different radiating plates. Varying the effective spring rate in this way optimizes the efficiency of the device by changing the output impedance of the radiating plates to one consisting mainly of radiation resistance.

BRIEF DESCRIPTION OF THE DRAWINGS

FIG. 1 is a perspective view of one variation of the invention using six seismic radiating plates.

FIG. 2 is a partial schematic cutaway side view of the device shown in FIG. 1.

FIG. 3 is a partial cross sectional side view of a variation of the present invention.

DESCRIPTION OF THE PREFERRED EMBODIMENTS

The disclosed apparatus is a device designed to emit a constantly varying FM signal which sweeps at least a portion of the frequency range between about 10 Hz and about 100 Hz. It is intended that the ihventive source be towed behind a seismic vessel which is moving as the source is operating. Typically, a streamer cable containing as many as a thousand hydrophones or more is also towed along behind the seismic vessel to pick up the echoed seismic signals returning from, e.g., subfloor geologic formations. In any event, the seismic source, as shown in perspective in FIG. 1, uses a number of fairly stiff radiators moving via connection with a hydraulic actuator oscillating at the desired frequency. The manner in which the frequency varies is a matter of technical choice. Typically, the frequency change rate will be linear with time. However, the rate may not be linear nor the range continuous. For instance, if the distance between the floor and the surface of the water body is a reenforcing multiple of some wavelength within the swept range, the frequency associated with that wavelength may be omitted from the range swept. The frequency may be ascending with time or descending with time.

Multiple radiating plates are used to make the operation and construction of the inventive devices more efficient. The radiated power of a seismic source is proportional to the square of the total area of the radiating plates. To radiate appreciable seismic energy, it is important that the effective radiating power be large. By ganging together a number of smaller radiating plates on a single shaft rather than relying on a single larger plate, the seismic source cross section can be significantly reduced. Obviously, a seismic source having a small cross section is easier to tow through the water. Smaller plates are much easier to rigidly construct and, as a result, are more durable than larger plates.

The inventive apparatus shown in FIG. 1 uses a number of radiating plates 10. The three radiating plates on the left side of the device, as shown in FIG. 1, are ganged together on a drive rod 12 so that the plates move simultaneously in or out from the center of the device. The drive rod 12 may be seen more clearly on the right end of FIG. 1. The drive rod passes through each of the back plates 14. The clearance holes 16 may be seen in back plates 14 on the right side of FIG. 1. The radiating plates are attached to the back plates via a set of flexible bellows or air springs 18. The back plates 14 are typically tied together and held in position a generally fixed distance from each other by frame rods 20. The two innermost back plates 14 are also joined to housing 22. Housing 22 contains the hydraulics necessary to drive both gangs of left hand and right hand radiating plates simultaneously in opposite directions. Eyes 24 are used to tow the device from the seismic vessel.

The back-to-back drive arrangement for the radiating plates minimizes forces on the housing 22. The simultaneous outward movement of the radiating plates allows the housing 22 to remain relatively stationary. The servo valves, hydraulic drive cylinders, and other suitable included equipment are therefore not subject to harmful acceleration forces.

FIG. 2 depicts, in cutaway fashion, one-half of the device shown in FIG. 1. The three radiating plates 10, back plates 14, and drive rod 12 are shown therein. Note that drive rod 12 is affixed to each of the radiating plates 10. The radiation load mass on a circular radiating plate is proportional of the radius cubed. By using a number of radiating plates, the device has the same effective radiating area as a larger single plate but with much less total mass loading. Frame rods 20 are affixed to each of back plates 14. Housing 22 with its attached eye 24 is rigidly connected to its adjacent back plates 14. Air springs 18 form one side of the seal keeping water from between radiating plates 10 and back plates 14. Inner bellows 26 form the seal between back plates 14 and drive rod 12 preventing flow of water from the surrounding water body through clearance hole 16 into the volume between radiating plates 10 and back plates 14. Double acting hydraulic cylinder 28 is shown within housing 22 with its attendant two way piston 30. In this configuration, piston 30 is shown as a part of drive rod 12. Of course, it is much more typical that a hydraulic piston be detachable from the drive rod. Also shown within housing 22 is spring 32. This spring is attached between cylinder 28 of the driver and the drive rod 12 to tune the total acoustic radiation load, and also help return the piston 30 to equilibrium position. As should be apparent from FIG. 1, a mirror image of the parts shown in FIG. 2 is present in the left hand of FIG. 1.

FIG. 3 shows, in partial cross section, an alternative device for linking the radiating plate 10a to the drive rod. This portion is very similar to the arrangement shown in FIG. 2 except that the radiating plate 10a is connected to drive rod 12 through spring 34 instead of the rigid joint shown in the other figures. An additional bellows 36 is also used to keep water out of the volume between radiating plate 10a and back plate 14 and to drive radiating plate 10a. Bellows 36 may alternately be placed on the outside of springs 34 to protect them from the watery environment. This variation operates in the following manner: The hydraulic cylinder moves drive rod 12 to the right. This motion stretches spring 34 and bellows 36 while compressing bellows 26. Backup plate 14 will remain stationary. Radiating plate 10a will move to the right. When drive rod 12 reverses itself and moves to the left, the opposite of the described process happens.

In any event, this arrangement also makes it possible to tune the acoustic radiation load of the source as a function of frequency. For example, in the push-pull arrangement shown herein a slowly sweeping FM signal is generated. By choosing different springs 36 along the drive rod 12, seismic energy may be transmitted from all of the radiating plates at low frequencies and fewer radiating plates at a specific higher frequency. Each radiating plate would be effectively decoupled from the drive rod at approximately $2\omega_n$ where:

$$\omega_n = (k_n/M_n)^{\frac{1}{2}}$$

and $\omega_n$ = radian frequency of source
$K_n$ = force constant of spring coupling radiating plate to the drive rod
$M_n$ = mass of radiation load plus mass of radiating plate The $\omega_n$ ($\omega_1$, $\omega_2$, 107 3, ...) would be distributed along the seismic band by choice of appropriate springs 36 and the overall distributed seismic source would be made more efficient by changing the mechanical load as a function of the instantaneous frequency of the transmitted FM signal.

The foregoing disclosures and description of the invention are only illustrative and explanatory thereof. Various changes in the size, shape, and materials of construction, as well as in the details of the illustrated construction and operation, may be made within the scope of the appended claims without departing from the spirit of the invention.

I claim as my invention:

1. A marine seismic source suitable for producing a seismic signal in waterbody, said seismic source comprising:
    a central housing having first and second ends and a longitudinal axis passing through said first and second ends:
    first and second sets of back plates corresponding, respectively, to said fitst and second ends of said central housing, each of said sets of back plates comprising an initial back plate fixedly attached to the corresponding end of said central housing and one or more additional back plates positioned axially outwardly from said initial back plate in a spaced relationship along said longitudinal axis, each of said back plates having a central hole therethrough, said central holes being substantially coaxial with said longitudinal axis;
    a plurality of frame rods interconnecting said back plates, whereby said back plates are fixedly positioned with respect to said central housing;
    first and second actuators located within said central housing and corresponding, respectively, to said first and second ends of said central housing, said first and second actuators having variable output frequencies;
    first and second drive rods corresponding, respectively, to said first and second actuators and said first and second ends of said central housing, each of said drive rods being fixedly attached to the corresponding actuator and extending axially outwardly through the corresponding end of said central housing and said central holes in said back plates;
    first and second gangs of seismic radiator plates corresponding, respectively, to said first and second sets of back plates, said first and second drive rods, and said first and second actuators, each of said seismic radiator plates corresponding to hnd being located axially outwardly of one of said back plates and being attached to the corresponding drive rod, each seismic radiator plate further having an outer edge;
    a plurality of first bellows means, each of said first bellows means corresponding to one of said seismic radiator plates and the corresponding back plate, each first bellows means being sealingly connected to said outer edge of said corresponding seismic radiator plate and to said corresponding back plate, thereby defining a cavity between said seismic radiator plate and said back plate;
    a plurality of sealing means, each of said sealing means corresponding to one of said back plates and being adapted to prevent water from entering said cavity through said central hole in said back plate and to permit the corresponding drive rod to move longitudinally through said central hole;
    each of said first and second actuators being adapted to oscillate the corresponding gang of seismic radiator plates through the corresponding drive rod so as to produce a repeating seismic signal having a frequency which varies with time in said waterbody, said first and second actuators being further adapted to oscillate said first and second gangs of seismic radiator plates substantially simultaneoulsly in opposite directions with respect to said central housing.

2. The marine seismic source of claim 1 wherein each said sealing means comprises a second bellows means smaller than said first bellows means, each said second bellows means being sealingly attached to said corresponding back plate around said central h6le and to said corresponding drive rod.

3. The marine seismic source of claim 1, said marine seismic source further comprising first and second spring means corresponding to said first and second gangs of seismic radiator plates, each of said spring means being located within said central housing so as to bias the corresponding gang of seismic radiator plates towards the middle of its oscillating movement.

4. The marine seismic source of claim 1 wherein each of said seismic radiator plates is fixedly attached to said corresponding drive rod.

5. The marine seismic source of claim 1 wherein said first and second actuators are variable frequency hydraulic cylinders.

6. The marine seismic source of claim 5 wherein said first and second actuators are adapted to sweep the frequency range between about 10 Hz and about 100 Hz.

7. The marine seismic source of claim 5 wherein said first and second actuators are adapted to sweep at least a portion of the frequency range between about 10 Hz and about 100 Hz.

8. The marine seismic source of claim 1 wherein each of said first and second drive rods passes loosely through a bore in each of said corresponding seismic radiator plates and is attached to each said corresponding seismic radiator plate through a spring and bellows.

9. The marine seismic source of claim 8 wherein each spring in a gang of seismic radiator plates has a spring rate different from all other springs in that gang.

10. The marine seismic source of claim 8 wherein at least one spring in each gang of seismic radiator plates has a spring rate different from all other springs in that gang.

* * * * *